United States Patent
Yang (10) Patent No.: US 10,743,292 B2
(45) Date of Patent: Aug. 11, 2020

(54) METHOD AND APPARATUS FOR RESOURCE ALLOCATION

(71) Applicant: GUANGDONG OPPO MOBILE TELECOMMUNICATIONS CORP., LTD., Dongguan, Guangdong (CN)

(72) Inventor: Ning Yang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/309,276

(22) PCT Filed: Aug. 17, 2016

(86) PCT No.: PCT/CN2016/095690
§ 371 (c)(1),
(2) Date: Dec. 12, 2018

(87) PCT Pub. No.: WO2018/032411
PCT Pub. Date: Feb. 22, 2018

(65) Prior Publication Data
US 2019/0141678 A1    May 9, 2019

(51) Int. Cl.
*H04W 72/04*    (2009.01)
*H04W 4/40*    (2018.01)

(52) U.S. Cl.
CPC .............. *H04W 72/04* (2013.01); *H04W 4/40* (2018.02); *H04W 72/0406* (2013.01)

(58) Field of Classification Search
CPC .... H04W 72/04; H04W 72/0406; H04W 4/40
See application file for complete search history.

(56) References Cited

U.S. PATENT DOCUMENTS

| | | | |
|---|---|---|---|
| 2006/0109865 A1* | 5/2006 | Park ................ | H04W 16/02 370/482 |
| 2009/0201867 A1 | 8/2009 | Teo et al. | |
| 2010/0227622 A1* | 9/2010 | Mody ................ | H04W 16/10 455/452.1 |
| 2011/0141933 A1* | 6/2011 | Kim ................ | H04W 52/146 370/252 |

(Continued)

FOREIGN PATENT DOCUMENTS

| | | |
|---|---|---|
| CN | 103001731 | 3/2013 |
| CN | 104981021 | 10/2015 |

(Continued)

OTHER PUBLICATIONS

EPO, Office Action for EP Application No. 16913171, dated May 9, 2019.

(Continued)

*Primary Examiner* — Ajay Cattungal
(74) *Attorney, Agent, or Firm* — Hodgson Russ LLP (57) ABSTRACT

Provided are a method and apparatus for resource allocation. The method includes: receiving, by a first device, first resource instruction information transmitted by a second device, the first resource instruction information being used to indicate a resource allocated for at least one first zone covered by the second device; and configuring, by the first device, a resource for at least one second zone covered by the first device according to the first resource instruction information.

17 Claims, 3 Drawing Sheets

(56) References Cited

U.S. PATENT DOCUMENTS

| | | | |
|---|---|---|---|
| 2012/0163278 A1 | 6/2012 | Chang et al. | |
| 2012/0307772 A1* | 12/2012 | Kwon | H04L 5/0057 |
| | | | 370/329 |
| 2016/0295589 A1* | 10/2016 | Nikopour | H04W 72/0453 |
| 2017/0208591 A1* | 7/2017 | Rico Alvarino | H04L 5/0039 |
| 2017/0290034 A1* | 10/2017 | Desai | H04W 4/027 |
| 2018/0042037 A1* | 2/2018 | Jin | H04W 72/1236 |
| 2018/0242302 A1* | 8/2018 | Lee | H04L 5/0069 |
| 2019/0230514 A1* | 7/2019 | Shi | H04W 72/00 |

FOREIGN PATENT DOCUMENTS

| | | |
|---|---|---|
| CN | 105430751 | 3/2016 |
| CN | 105516214 | 4/2016 |
| CN | 105517059 | 4/2016 |
| JP | 2008048148 | 2/2008 |
| JP | 2012010018 | 1/2012 |
| JP | 2014516498 | 7/2014 |
| WO | 2016078551 | 5/2016 |

OTHER PUBLICATIONS

WIPO, ISR for PCT/CN2016/095690, Mar. 22, 2017.
EPO, Office Action for EP Application No. 16913171.1, dated May 8, 2020.
JPO, Office Action for JP Application No. 2019-500252, dated Mar. 17, 2020.

* cited by examiner

First device receives first resource indication information sent by a second device, wherein the first resource indication information is used to indicate a resource occupied by at least one first zone covered by the second device — S210

The first device configures a resource of at least one second zone covered by the first device according to the first resource instruction information — S220

Second device transmits first resource instruction information to a first device, the first resource instruction information being used to indicate a resource occupied by at least one first zone covered by the second device, so that the first device configures a resource of at least one second zone covered by the first device according to the first resource instruction information — S310

METHOD AND APPARATUS FOR RESOURCE ALLOCATION

CROSS-REFERENCE TO RELATED APPLICATIONS

The present application is a national phase entry under 35 USC § 371 of International Application PCT/CN2016/095690, filed Aug. 17, 2016, the entire disclosure of which is incorporated herein by reference.

TECHNICAL FIELD

The present application relates to the field of communications, and more particularly, to a method and apparatus for resource allocation in the field of communications.

BACKGROUND

Device to Device (D2D) communication has been standardized in the 3rd Generation Partnership Project (3GPP) protocol. Resource allocation of D2D communication may be realized through two manners as follows. In the first manner, a network device allocates transmission resources of the D2D communications. This manner is suitable for the case with cellular network coverage. In the second manner, a terminal device independently selects the transmission resources, for example, the terminal device may randomly select one resource allocation pattern from a plurality of resource allocation patterns specified in advance and determine the transmission resource to be used for the D2D communications according to the selected resource allocation pattern. The second manner is mainly applicable to the case without the cellular network coverage.

With the further development of communication technologies, Vehicle to Vehicle (V2V) technology and Vehicle to X (V2X) technology have become research hotspots. In V2X, X may refer to any device with wireless receiving and transmitting capabilities, such as, but not limited to, a slow-moving wireless apparatus, a fast-moving on-vehicle device, or a network control node with wireless transmitting and receiving capabilities, etc. However, the above resource allocation manners in the related art are not suitable for the V2V technology and V2X technology due to the fast-moving property of the on-vehicle device. Therefore, the zone-based resource allocation manner is proposed in the V2V technology and V2X technology. In this manner, a cell covered by the network device is divided into several zones geographically, and resources or resource pools are allocated for each zone, so as to ensure that there is less interference when the terminal devices uses the resources or resource pools in adjacent zones to communicate, and resources reuse can be performed in the resource pools far away from each other. However, when the terminal device uses the resources or resource pools between the adjacent zones covered by two adjacent network devices to communicate, certain interference will be occurred, thus reducing the communication quality.

SUMMARY

The embodiments of the present application provide a method and apparatus for resource allocation, which can improve the communication quality of data.

According to a first aspect, there is provided a method for resource allocation, including: receiving, by a first device, first resource instruction information transmitted by a second device, the first resource instruction information being used to indicate a resource allocated for at least one first zone covered by the second device; and configuring, by the first device, a resource for at least one second zone covered by the first device according to the first resource instruction information.

In this way, interference between the resource for the at least one second zone configured by the first device and the resource for the at least one first zone covered by the second device can be small, so that when different terminal devices transmit data in the adjacent zones, interference between adjacent zones can be reduced, and the communication quality of data can be improved.

Optionally, the first device may configure a resource for the zone covered by itself according to the first resource instruction information, for example, the first device may configure the resource for the at least one second zone to be orthogonal to the resource for the at least one first zone, so that there is no interference when different terminal devices transmit data in different zones covered by the first device, and the communication quality of data is further improved.

Further, after the first device acquires the first resource indication information transmitted by the second device, the first device may configure the resource for the zone where the first device locates according to a resource status of the second device and configure the resource thereof according to a network load of the second device, so that a utilization rate of resources can be improved.

Optionally, the at least one first zone may be all or part of the zone covered by the second device. The at least one second zone may be all or part of the zone covered by the first device.

In a first probable implementation manner of the first aspect, the at least one first zone is adjacent to the at least one second zone.

Specifically, the at least one first zone may be the zone of interest to the first device, for example, the first device needs to configure the resource for the at least one second zone, needs to acquire the zone covered by the second device and adjacent to the at least one second zone, and the first device configures the resource thereof according to a resource for the adjacent zone covered by the second device; and further, the first device may configure the resource for the at least one second zone to be orthogonal to the resource for the at least one first zone, thus ensuring that the resources of the adjacent zones of the two devices are orthogonal, which can avoid interference when two different terminal devices communicate in the two adjacent zones, and can improve the communication quality.

With reference to the above probable implementation manner of the first aspect, in a second probable implementation manner of the first aspect, after the configuring, by the first device, the resource for the at least one second zone covered by the first device according to the first resource instruction information, the method further includes: transmitting, by the first device, second resource instruction information to the second device, the second resource instruction information being used to indicate a resource allocated for the at least one second zone.

When the second device needs to configure the resource for the zone covered by the second device, the second device may configure the resource according to the resource for the zone covered by the first device, avoiding the resource conflict or idle resources caused by blind configuration, and improving the utilization rate of resources.

With reference to the above probable implementation manners of the first aspect, in a third probable implementation manner of the first aspect, the configuring, by the first device, the resource for the at least one second zone covered by the first device according to the first resource instruction information includes: configuring, by the first device, the at least one second zone and the at least one first zone to occupy a same resource according to the first resource instruction information; or configuring, by the first device, a resource for the at least one second zone to be orthogonal to a resource for an adjacent zone in the at least one second zone according to the first resource instruction information.

With reference to the above probable implementation manners of the first aspect, in a fourth probable implementation manner of the first aspect, the configuring, by the first device, the resource for the at least one second zone covered by the first device according to the first resource instruction information includes: configuring, by the first device, resources of adjacent zones in the at least one second zone to be orthogonal according to the first resource instruction information.

With reference to the above probable implementation manners of the first aspect, in a fifth probable implementation manner of the first aspect, before the receiving, by the first device, the first resource instruction information transmitted by the second device, the method further includes: transmitting, by the first device, a resource request message to the second device, the resource request message being used to request the resource allocated for the at least one first zone, wherein the receiving, by the first device, the first resource instruction information transmitted by the second device includes: receiving, by the first device, the first resource instruction information transmitted by the second device according to the resource request message.

With reference to the above probable implementation manners of the first aspect, in a sixth probable implementation manner of the first aspect, the resource request message includes a transmission mode of the first resource instruction information, and the transmission mode includes: a periodic transmission mode or an aperiodic transmission mode.

In other words, the resource request message carries the transmission mode of the first resource instruction information, for example, the transmission mode of the first resource instruction information may be periodic transmission or aperiodic transmission; or, the periodic transmission and the aperiodic transmission may be alternated.

With reference to the above probable implementation manners of the first aspect, in a seventh probable implementation manner of the first aspect, the first device is a device in an Internet of Vehicles, and/or, the second device is a device in an Internet of Vehicles.

The concept of zone is introduced into the Internet of Vehicles. Different zones are divided based on geographical locations and identified by zones. Each zone corresponds to certain resources, which may be one or more resource pools specifically. The terminal device in the Internet of Vehicles moves fast. The resources of adjacent zones in the same network are guaranteed to be orthogonal and without interference through zone division, and resources of adjacent zones of the first device and the second device can be guaranteed to be orthogonal through the interaction between the first device and the second device.

Optionally, the first device and the second device may be network devices, or any devices with resource configuration capacities.

Optionally, when one zone corresponds to a plurality of resource pools, different resource pools may be used for different services, for example, when the terminal device moves to the zone, a resource pool 1 of this zone is used for A service communication and a resource pool 2 of this zone is used for B service communication, which may be specified through network configuration or protocol.

According to a second aspect, there is provided a method for resource allocation, including: transmitting, by a second device, first resource instruction information to a first device, the first resource instruction information being used to indicate a resource allocated for at least one first zone covered by the second device, so that the first device configures a resource for at least one second zone covered by the first device according to the first resource instruction information.

The second device may periodically or non-periodically transmit the first resource indication information to the first device, or transmit the first resource indication information periodically and non-periodically in an alternative way, and the specific transmission mode may be configured through networks or stipulated through protocols, and the embodiments of the present application are not limited thereto.

In a first probable implementation manner of the second aspect, the at least one first zone is adjacent to the at least one second zone.

With reference to the above probable implementation manner of the second aspect, in a second probable implementation manner of the second aspect, after the transmitting, by the second device, the first resource instruction information to the first device, the method further includes: receiving, by the second device, second resource instruction information transmitted by the first device, the second resource instruction information being used to indicate a resource allocated for the at least one second zone.

With reference to the above probable implementation manners of the second aspect, in a third probable implementation manner of the second aspect, before the transmitting, by the second device, the first resource instruction information to the first device, the method further includes: receiving, by the second device, a resource request message transmitted by the first device, the resource request message being used to request the resource allocated for the at least one first zone; wherein, the transmitting, by the second device, the first resource instruction information to the first device includes: transmitting, by the second device, the first resource instruction information to the first device according to the resource request message.

With reference to the above probable implementation manners of the second aspect, in a fourth probable implementation manner of the second aspect, the resource request message includes a transmission mode of the first resource instruction information, and the transmission mode includes: a periodic transmission mode or an aperiodic transmission mode.

With reference to the above probable implementation manners of the second aspect, in a fifth probable implementation manner of the second aspect, the first device is a device in an Internet of Vehicles, and/or, the second device is a device in an Internet of Vehicles.

According to a third aspect, there is provided an apparatus for resource allocation, which is used to perform the methods according to the first aspect or any probable implementation manner of the first aspect above. Specifically, the apparatus includes modules adapted to perform the methods according to the first aspect or any probable implementation manner of the first aspect above.

According to a fourth aspect, there is provided an apparatus for resource allocation, which is used to perform the methods according to the second aspect or any probable implementation manner of the second aspect above. Specifically, the apparatus includes modules adapted to perform the methods according to the second aspect or any probable implementation manner of the second aspect above.

According to a fifth aspect, there is provided an apparatus for resource allocation, including: a receiver, a transmitter, a memory, a processor and a bus system. The receiver, the transmitter, the memory and the processor are connected through the bus system, the memory is used to store instructions, the processor is used to execute the instructions stored in the memory to control the receiver to receive signals and the transmitter to transmit signals, and when the processor executes the instructions stored in the memory, the execution enables the processor to perform the methods according to the first aspect or any probable implementation manner of the first aspect.

According to a sixth aspect, there is provided an apparatus for resource allocation, including: a receiver, a transmitter, a memory, a processor and a bus system. The receiver, the transmitter, the memory and the processor are connected through the bus system, the memory is used to store instructions, the processor is used to execute the instructions stored in the memory to control the receiver to receive signals and the transmitter to transmit signals, and when the processor executes the instructions stored in the memory, the execution enables the processor to perform the methods according to the second aspect or any probable implementation manner of the second aspect.

According to a seventh aspect, there is provided a system for resource allocation, including the apparatus according to the fifth aspect and the apparatus according to the sixth aspect.

According to an eighth aspect, there is provided a computer storage medium for storing a computer program which includes instructions used to perform the methods according to the first aspect or any probable implementation manner of the first aspect.

According to a ninth aspect, there is provided a computer storage medium for storing a computer program which includes instructions used to perform the methods according to the second aspect or any probable implementation manner of the second aspect.

BRIEF DESCRIPTION OF THE DRAWINGS

In order to illustrate the technical solutions of the embodiments of the present application more clearly, the drawings used in the description of the embodiments or the related art will be briefly described below. Obviously, the drawings in the following description are merely some embodiments of the present application. Those of ordinary skills in the art can also obtain other drawings based on these drawings without going through any creative effort.

DETAILED DESCRIPTION

The following clearly and completely describes the technical solutions in the embodiments of the present application with reference to the accompanying drawings in the embodiments of the present application. Apparently, the described embodiments are merely some but not all of the embodiments of the present application. Based on the embodiments of the present application, all other embodiments obtained by those of ordinary skills in the art without going through any creative work shall fall within the scope of protection of the present application.

It should be understood that the technical solutions of the embodiments of the present application can be applied to various communication systems, for example: a Global System of Mobile Communication ("GSM" for short), a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, a LTE Frequency Division Duplex ("FDD" for short) system, a LTE Time Division Duplex ("TDD" for short), a Universal Mobile Telecommunication System ("UMTS" for short), or a Worldwide Interoperability for Microwave Access ("WIMAX" for short) communication system, and possible communication systems in the future, etc.

It should also be understood that a network device may be a device that communicates with a terminal device. Each network device may provide communication coverage for a specific geographic zone and may communicate with a terminal device (e.g., UE) located in the coverage zone. The network device may be a Base Transceiver Station ("BTS" for short) in a GSM or CDMA, an NodeB ("NB" for short) in a WCDMA system, an Evolutional NodeB ("eNB or eNodeB" for short) in a LTE system, or a wireless controller in a Cloud Radio Access Network ("CRAN" for short) scenario; or, the network device may be a relay station, an access point, an on-vehicle device, a wearable device and a network device in future 5G networks or a network device in future evolved PLMN networks, etc.

It should also be understood that the terminal device may be mobile or fixed. The terminal device may refer to an access terminal, a user device, a user unit, a user station, a mobile station, a mobile, a remote station, a remote terminal, a mobile device, a user terminal, a terminal, a wireless communication device, a user agent or a user apparatus, etc. The access terminal may be a cellular phone, a cordless phone, a Session Initiation Protocol (SIP) Phone, a Wireless Local Loop (WLL) Station, a Personal Digital Assistant (PDA), a handheld device with wireless communication capabilities, a computing device or other processing device connected to a wireless modem, an on-vehicle device, a wearable device, a terminal device in future 5G networks, or a terminal device in future evolved Public Land Mobile Network (PLMN) networks.

In some embodiments, the D2D communication may refer to Vehicle to Vehicle ("V2V" for short) communication, or V2X communication. In the V2X communication, X may refer to any device with wireless receiving and transmitting capabilities, such as, but not limited to, a slow-moving wireless apparatus, a fast-moving on-vehicle device, or a network control node with wireless transmitting and receiving capabilities, etc.

Specifically, the terminal device may communicate in a cellular communication mode or a D2D communication mode. In the cellular communication mode, the terminal device communicates with other terminal devices through a cellular link with the network device. In the D2D communication mode, two terminal devices communicate directly through a D2D link.

When the terminal device performs the D2D communication (e.g., V2V communication or V2X communication), the terminal device may select transmission resources independently or the network device may allocate transmission resources for the terminal device during the D2D communication, which is not limited in the embodiments of the present application.

It should be understood that the embodiments of the present application are mainly applied to the V2X communication scenarios, but can also be applied to any other D2D communication scenario, which is not limited in the embodiments of the present application.

Figure 1:
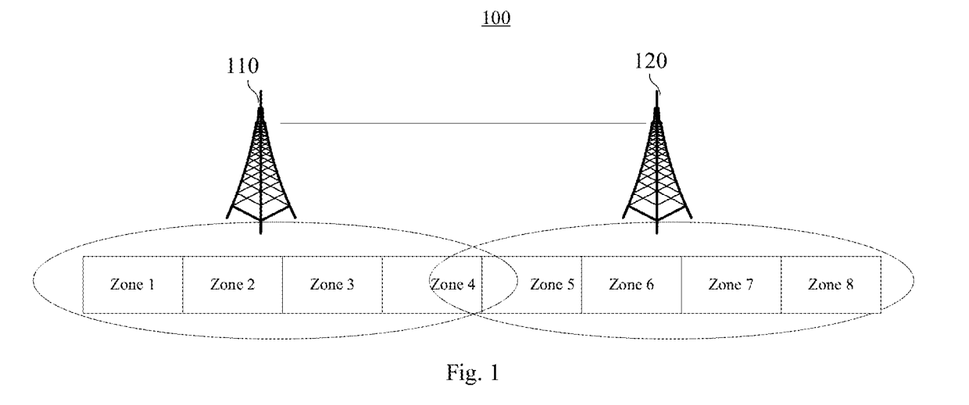
FIG. 1 is a schematic diagram of a wireless communication system to which an embodiment of the present application is applied.

FIG. 1 is a schematic diagram of a wireless communication system 100 to which the embodiments of the present application are applied. The wireless communication system 100 may include a plurality of network devices. In FIG. 1, it is explained by only taking two network devices 110 and 120 as an example. Optionally, there may be other number of terminal devices within the coverage zone of each network device, which is not limited by the embodiments of the present application. In addition, the wireless communication system 100 may also include other network entities such as a Mobile Management Entity (MME), a Serving Gateway (S-GW), a Packet Data Network Gateway (P-GW), but the embodiments of the present application are not limited thereto.

Cells covered by the network device 110 may be divided into Zone 1, Zone 2, Zone 3 and Zone 4. Cells covered by the network device 120 may be divided into Zone 5, Zone 6, Zone 7 and Zone 8. Each of the above eight zones corresponds to a certain resource, and each zone may be identified by a corresponding zone identity, such as a zone Identity (ID), and each zone identity corresponds to a resource identity corresponding to the zone. For example, each zone corresponds to one or more resource pools. When the terminal device moves to each zone, the terminal device may communicate using the resource corresponding to each zone. The network device 110 may configure the resources of Zone 1 and Zone 2 to be orthogonal, the resources of Zone 2 and Zone 3 to be orthogonal, and the resources of Zone 3 and Zone 4 to be orthogonal. The network device 120 may configure the resources of Zone 5 and Zone 6 to be orthogonal, the resources of Zone 6 and Zone 7 to be orthogonal, and the resources of Zone 7 and Zone 8 to be orthogonal. In this way, different terminal devices can communicate between adjacent zones without interference. However, it cannot be guaranteed that the resource corresponding to Zone 4 is orthogonal to the resource corresponding to Zone 5, so that interference will be caused when two terminal devices transmit data in Zone 4 and Zone 5 at the same time, and thus the communication quality is reduced. The present application can solve this problem through interactive signaling between the network device 110 and the network device 120, for example, the network device 110 may be a first device in the embodiment of the present application and the network device 120 may be a second device in the embodiment of the present application.

Figure 2:
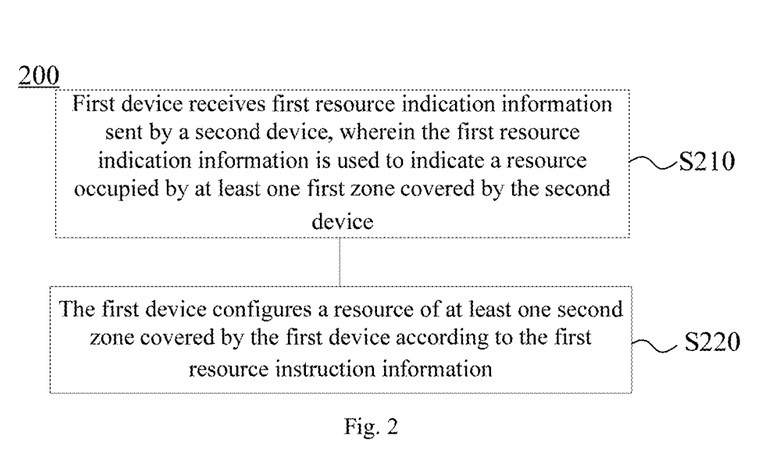
FIG. 2 is a schematic diagram of a method for resource allocation according to an embodiment of the present application.

FIG. 2 illustrates a schematic flow chart of a method for resource allocation 200 according to an embodiment of the present application. FIG. 2 illustrates steps or operations of the method for resource allocation, but these steps or operations are only examples. The embodiments of the present application may also perform other operations or variations of the various operations of FIG. 2. The method 200 includes the following steps.

In S210, a first device receives first resource instruction information transmitted by a second device, the first resource instruction information being used to indicate a resource allocated for at least one first zone covered by the second device.

In S220, the first device configures a resource for at least one second zone covered by the first device according to the first resource instruction information.

Figure 3:
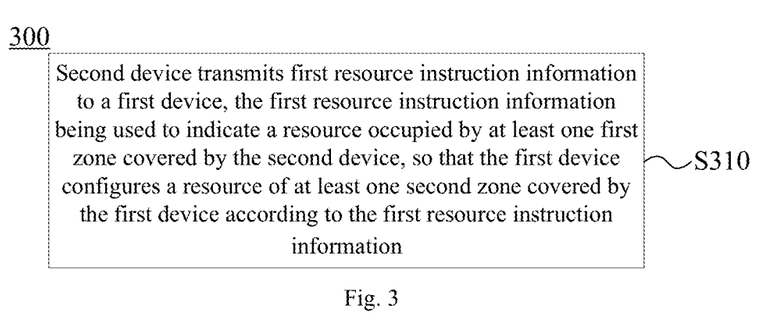
FIG. 3 is a schematic diagram of another method for resource allocation according to an embodiment of the present application.

FIG. 3 illustrates a schematic flow chart of a method for resource allocation 300 according to an embodiment of the present application. FIG. 3 illustrates steps or operations of the method for resource allocation, but these steps or operations are only examples. The embodiments of the present application may also perform other operations or variations of the various operations of FIG. 3. The method 300 includes the following steps.

In S310, a second device transmits first resource instruction information to a first device, the first resource instruction information being used to indicate a resource allocated for at least one first zone covered by the second device, so that the first device configures a resource for at least one second zone covered by the first device according to the first resource instruction information.

Specifically, after the second device transmits the first resource indication information to the first device, the first device may configure a resource for the zone covered by itself according to the first resource instruction information, thus ensuring small interference between the resource for the at least one second zone configured by the first device and the resource for the at least one first zone covered by the second device, so that when different terminal devices communicate in the adjacent zones, the interference between adjacent zones can be reduced, and the communication quality of data can be improved.

For example, the first device may be the network device 110 in FIG. 1, and the second device may be the network device 120 in FIG. 1; or, the first device may be the network device 120 in FIG. 1, and the second device may be the network device 110 in FIG. 1. Alternatively, the first device and the second device may be other devices.

Optionally, the first device may configure the resource for the zone covered by itself according to the first resource instruction information, for instance, the first device may configure the resource for the at least one second zone to be orthogonal to the resource for the at least one first zone; in this way, there is no interference when different terminal devices transmit data in different zones covered by the first device, thereby further improving the communication quality of data.

Moreover, after the first device acquires the first resource indication information transmitted by the second device, the first device may configure the resource for the zone where the first device locates according to a resource status of the second device and configure the resource thereof according to a network load of the second device, so that a utilization rate of resources can be improved.

Moreover, the first device may receive resource indication information transmitted by a plurality of second devices, and the first device determines the resource for the zone covered by itself according to the resource usage status of zones covered by the plurality of network devices, so that the resource in the zone covered by the first device can be orthogonal to resources of all the surrounding network devices.

Optionally, the at least one first zone may be all or part of the zone covered by the second device, for example, when the second device covers four zones, the at least one first zone may be one zone adjacent to the first device; or, the at least one first zone may be two zones, both of which may be adjacent to the zone covered by the first device, or one of the two zones may be adjacent to the zone covered by the first device and the other of the two zones may not be adjacent to the zone covered by the first device; or, the at least one second zone may be all the four zones, but the embodiments of the present application are not limited thereto. Similarly, the at least one second zone may also be all or part of the zone covered by the first device, but the embodiments of the present application are not limited thereto.

It should be appreciated that the second device may periodically or non-periodically transmit the first resource indication information to the first device, or transmit the first resource indication information periodically and non-periodically in an alternative way, and the specific transmission mode may be configured through networks or stipulated through protocols, and the embodiments of the present application are not limited thereto.

As an optional embodiment, the at least one first zone is adjacent to the at least one second zone.

Specifically, the first device may be the network device 110 in FIG. 1, the second device may be the network device 120 in FIG. 2, the at least one second zone may be the zone 4, and the at least one first zone may be the zone 5, so that the interference between the resource for the zone 5 determined by the first device and the resource for the zone 4 is small, and further, the first device may determine that the resource for the zone 5 is orthogonal to the resource for the zone 4. In this way, there is no interference when different terminal devices transmit data in the zone 4 and the zone 5, and the communication reliability can be further ensured.

It should be understood that in the embodiments of the present application, the first device configures the at least one second zone, and may configure that the resource for the at least one second zone is orthogonal to the resource for the at least one first zone. It is only a preferred embodiment to configure the resources to be orthogonal. In practical applications, the first device may also configure that the interference between the resources is small, for example, configure that an interference threshold between the at least one second zone and the at least one first zone is less than a set threshold.

As an optional embodiment, after the first device configures the resource for the at least one second zone covered by the first device according to the first resource instruction information, the first device transmits second resource instruction information to the second device, and the second device receives the second resource instruction information transmitted by the first device, the second resource instruction information being used to indicate a resource allocated for the at least one second zone.

Specifically, after the first device configures the resource in the at least one second zone, the first device transmits the second resource indication information to the second device, informing the resource status of the at least one second zone to the second device. When the second device needs to configure the resource for the zone covered by itself, the second device may configure the resource according to the second indication information, so that the configured resource for the at least one first zone is orthogonal to the resource for the at least one second zone, or the second device may configure the resource for the at least one first zone according to the resource status of the at least one second zone, avoiding the resource conflict or idle resources caused by blind configuration, and improving the utilization rate of resources.

As an optional embodiment, the first device configures the at least one second zone and the at least one first zone to occupy a same resource according to the first resource instruction information; or, the first device configures a resource for the at least one second zone to be orthogonal to a resource for an adjacent zone in the at least one second zone according to the first resource instruction information.

As an optional embodiment, the configuring, by the first device, the resource for the at least one second zone covered by the first device according to the first resource instruction information includes: configuring, by the first device, the resources of adjacent zones in the at least one second zone to be orthogonal according to the first resource instruction information.

Specifically, the first device may configure that the at least one second zone and the at least one first zone occupy the same resource; if the resources of any two zones in the at least one first zone covered by the second device are orthogonal, for example, when the first device in FIG. 1 is a network device 110, and the second device is a network device 120, the first device may configure the zone 1 and the zone 5 to use the same resource, the zone 2 and the zone 6 to use the same resource, the zone 3 and the zone 7 to use the same resource, and the zone 4 and the zone 8 to use the same resource. For another example, if a resource for the zone 5 is orthogonal to a resource for the zone 8, the first device may configure the zone 1 to use a resource for the zone 7, the zone 2 to use a resource for the zone 8, the zone 3 to use a resource for the zone 5, and the zone 4 to use a resource for the zone 6. For still another example, if the first device further includes a zone 9, and the zone 9 is adjacent to the zone 1 at the right of the zone 1, then the first device may configure the zone 1 and the zone 5 to use the same resource, the zone 2 and the zone 6 to use the same resource, the zone 3 and the zone 7 to use the same resource, and the zone 4 and the zone 8 to use the same resource. The first device configures a resource for the zone 9 to be orthogonal to a resource for the zone 1. The zones using the same resource may communicate data through time division multiplexing or frequency division multiplexing.

Specifically, the configuring, by the first device, the resource for the at least one second zone to be orthogonal to the resource for the adjacent zone in the at least one second zone according to the first resource instruction information may also include: configuring resources of adjacent zones in the at least one second zone to be orthogonal. For example, when the first device in FIG. 1 is the network device 110 and the second device is the network device 120, the second device transmits resource statuses of the zone 5, the zone 6, the zone 7 and the zone 8 to the first device through the first resource instruction information. When determining resources allocated for the zone 5, the zone 6, the zone 7 and the zone 8 according to the first resource instruction information, the first device configures resources of the zone 4 and the zone 5 to be orthogonal, resources of the zone 3 and the zone 4 to be orthogonal, resources of the zone 3 and the zone 2 to be orthogonal, and resources of the zone 2 and the zone 1 to be orthogonal.

As an optional embodiment, before the receiving, by the first device, the first resource instruction information transmitted by the second device, the method further includes: transmitting, by the first device, a resource request message to the second device, the resource request message being used to request the resource allocated for the at least one first zone; and receiving, by the second device, the resource request message transmitted by the first device. The transmitting, by the second device, the first resource instruction information to the first device includes: transmitting, by the second device, the first resource instruction information to the first device according to the resource request message. The receiving, by the first device, the first resource instruction information transmitted by the second device includes: receiving, by the first device, the first resource instruction information transmitted by the second device according to the resource request message.

Specifically, the second device may transmit the first resource indication information directly to the first device, and the second device may also transmit the first resource indication information to the second device based on a request of the first device, i.e., the first device may transmit the resource request message to the second device to request resource occupancy condition of the zone covered by the second device, for example, the resource request message may request occupied resources of the zone adjacent to the first device, or may request occupied resources of part or all of the zone covered by the second device, and after the second device receives the resource request message, the second device may transmit the first resource instruction information to the first device according to the resource request message. Optionally, when the first device needs to configure resources, the first device transmits the resource request message to the second device to learn the resource occupation condition of the zone covered by the second device.

As an optional embodiment, the resource request message includes a transmission mode of the first resource instruction information, and the transmission mode includes: a periodic transmission mode or an aperiodic transmission mode.

In other words, the resource request message carries the transmission mode of the first resource instruction information, for example, the transmission mode of the first resource instruction information may be periodic transmission or aperiodic transmission; alternatively, the periodic transmission and the aperiodic transmission may be used to transmit the first resource instruction information in an alternated manner. The embodiments of the present application are not limited thereto.

As an optional embodiment, the first device is a device in an Internet of Vehicles, and/or, the second device is a device in an Internet of Vehicles.

Specifically, the concept of zone is introduced into the Internet of Vehicles. Different zones are divided based on geographical locations and identified by zone identities. Each zone corresponds to certain resources, which may be one or more resource pools specifically. The terminal device in the Internet of Vehicles moves fast. The resources of adjacent zones in the same network are guaranteed to be orthogonal without interference through zone division, and resources of adjacent zones of the first device and the second device can be guaranteed to be orthogonal through the interaction between the first device and the second device.

Optionally, the first device and the second device may be network devices, or devices with resource configuring capabilities, for instance, the first device and the second device may be devices with resource configuring capabilities in V2V. The first device may be a device in the Internet of Vehicles, and the second device may be a device in the Internet of Vehicles; or, the first device may be a device in the Internet of Vehicles, and the second device may be a device in a cellular network; or both the first device and the second device may be devices in the cellular network. The embodiments of the present application are not limited thereto. Alternatively, the first device may have the resource configuring capabilities, and the second device may not have the resource configuring capabilities. For example, the second device only transmits the resource occupancy condition thereof to the first device through the first resource indication information, which is not limited in the embodiments of this application.

Optionally, when one zone corresponds to multiple resource pools, different resource pools may be used for different services, for example, when the terminal device moves to this zone, a resource pool 1 of the zone is used for A service communication and a resource pool 2 of the zone is used for B service communication. Specifically, a corresponding relationship between the resource pools and the services may be configured through networks or stipulated through protocols, which is not limited in the embodiments of the present application.

Optionally, the second device may transmit the first resource instruction information to the first device according to an existing X2 interface between the base stations, for instance, through a load information message (LOAD INFORMATION message). The first resource instruction information may be carried through the LOAD INFORMATION message and transmitted to the first device, may be carried through a newly designed message, or carried in new signaling defined in a future network system.

Optionally, the first device may transmit the resource request message to the second device through the existing X2 interface between the base stations, for example, the resource request message may be transmitted through a resource status request message (RESOURCE STATUS REQUEST message), the first resource instruction message may be transmitted through a resource status response message (RESOURCE STATUS RESPONSE message) or a resource status update message (RESOURCE STATUS UPDATE message), the first device may carry the resource request message through the RESOURCE STATUS REQUEST message and transmit the resource request message to the second device, and the second device may carry the first resource instruction information in the RESOURCE STATUS RESPONSE message or the RESOURCE STATUS UPDATE and transmit the first resource instruction information to the first device. Alternatively, the resource request message or the first resource instruction information may also be carried in other signaling interacted between the first device and the second device, or a newly designed message, and the embodiments of the present application are not limited thereto.

It should be understood that the information interaction between the first device and the second device mentioned in the embodiments of the present application may be based on the signaling interaction between the existing devices, and the information in the embodiments of the present application may be carried in the existing signaling, or may be carried in a newly designed message, or may be carried in a new signaling defined in a future network system, which is not limited in the embodiments of the present application.

Figure 4:
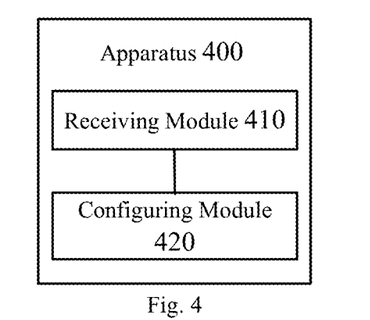
FIG. 4 is a schematic block diagram of an apparatus for resource allocation according to an embodiment of the present application.

FIG. 4 illustrates a schematic diagram of an apparatus for resource allocation 400 according to an embodiment of the present application, for instance, the apparatus 400 may be a network device. The apparatus 400 includes: a receiving module 410, and a configuring module 420.

The receiving module 410 is adapted to receive first resource instruction information transmitted by a second device, the first resource instruction information being used to indicate a resource allocated for at least one first zone covered by the second device.

The configuring module 420 is adapted to configure a resource for at least one second zone covered by the apparatus according to the first resource instruction information.

As an optional embodiment, the at least one first zone is adjacent to the at least one second zone.

As an optional embodiment, the apparatus 400 further includes: a first transmitting module adapted to, after configuring the resource for the at least one second zone covered by the apparatus according to the first resource instruction information, transmit second resource instruction information to the second device, the second resource instruction information being used to indicate a resource allocated for the at least one second zone.

As an optional embodiment, the configuring module 420 is specifically adapted to: configure the at least one second zone and the at least one first zone to occupy a same resource according to the first resource instruction information; or, configure a resource for the at least one second zone to be orthogonal to a resource for an adjacent zone in the at least one first zone according to the first resource instruction information.

As an optional embodiment, the configuring module 420 is further specifically adapted to: configure resources of adjacent zones in the at least one second zone to be orthogonal according to the first resource instruction information.

As an optional embodiment, the apparatus 400 further includes: a second transmitting module adapted to, before receiving the first resource instruction information transmitted by the second device, transmit a resource request message to the second device, the resource request message being used to request the resource allocated for the at least one first zone; and the receiving module 410 is specifically adapted to: receive the first resource instruction information transmitted by the second device according to the resource request message.

As an optional embodiment, the resource request message includes a transmission mode of the first resource instruction information, and the transmission mode includes: a periodic transmission mode or an aperiodic transmission mode.

As an optional embodiment, the apparatus 400 is a device in an Internet of Vehicles, and/or, the second device is a device in the Internet of Vehicles.

It should be appreciated that the apparatus 400 herein is embodied in the form of a functional module. The term "module" herein may refer to an Application Specific Integrated Circuit (ASIC), an electronic circuit, a processor (e.g., a shared processor, a proprietary processor or a group processor, etc.) for executing one or more software or firmware programs and a memory, a merged logic circuit, and/or other suitable components that support the described functions. In an optional example, those skilled in the art can understand that the apparatus 400 may be embodied as the first device in the above-described embodiments, and the apparatus 400 may be used to perform various processes and/or steps corresponding to the first device in the above-described method embodiments, which are not elaborated herein to avoid repetition.

Figure 5:
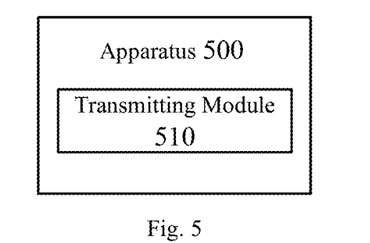
FIG. 5 is a schematic block diagram of another apparatus for resource allocation according to an embodiment of the present application.

FIG. 5 illustrates a schematic diagram of an apparatus for resource allocation 500 according to an embodiment of the present application, for instance, the apparatus 500 may be a terminal device. The apparatus 500 includes: a transmitting module 510.

The transmitting module 510 is adapted to transmit first resource instruction information to a first device, the first resource instruction information being used to indicate a resource allocated for at least one first zone covered by the apparatus, so that the first device configures a resource for at least one second zone covered by the first device according to the first resource instruction information.

As an optional embodiment, the at least one first zone is adjacent to the at least one second zone.

As an optional embodiment, the apparatus 500 further includes: a first receiving module adapted to, after transmitting the first resource instruction information to the first device, receive second resource instruction information transmitted by the first device, the second resource instruction information being used to indicate a resource allocated for the at least one second zone.

As an optional embodiment, the apparatus 500 further includes: a second receiving module adapted to, before transmitting the first resource instruction information to the first device, receive a resource request message transmitted by the first device, the resource request message being used to request the resource allocated for the at least one first zone, and the transmitting module is specifically adapted to: transmit the first resource instruction information to the first device according to the resource request message.

As an optional embodiment, the resource request message includes a transmission mode of the first resource instruction information, and the transmission mode includes: a periodic transmission mode or an aperiodic transmission mode.

As an optional embodiment, the first device is a device in an Internet of Vehicles, and/or, the apparatus 500 is a device in the Internet of Vehicles.

It should be appreciated that the apparatus 500 herein is embodied in the form of a functional module. The term "module" herein may refer to an ASIC, an electronic circuit, a processor (e.g., a shared processor, a proprietary processor or a group processor, etc.) for executing one or more software or firmware programs and a memory, a merged logic circuit, and/or other suitable components that support the described functions. In an optional example, those skilled in the art can understand that the apparatus 500 may be embodied as the second device in the above-described embodiments, and the apparatus 500 may be used to perform various processes and/or steps corresponding to the second device in the above-described method embodiments, which are not elaborated herein to avoid repetition.

Figure 6:
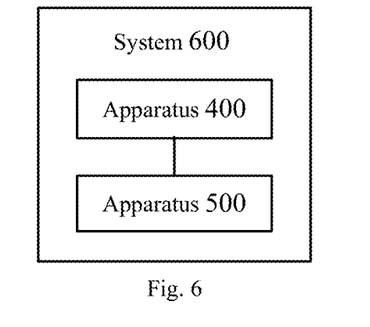
FIG. 6 is a schematic block diagram of a system for resource allocation according to an embodiment of the present application.

FIG. 6 is a schematic structure diagram of a system for resource allocation 600 according to an embodiment of the present application. The communication system 600 includes the apparatus 400 and the apparatus 500.

Figure 7:
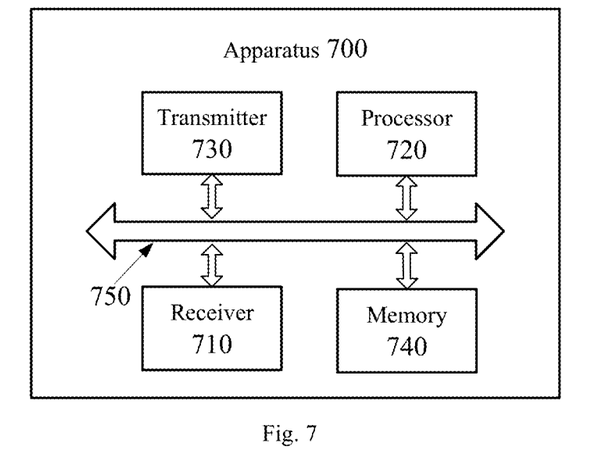
FIG. 7 is a schematic block diagram of an apparatus for resource allocation according to an embodiment of the present application.

FIG. 7 illustrates an apparatus for resource allocation 700 provided by an embodiment of the present application, for instance, the apparatus 700 may be a first device. The apparatus 700 includes a receiver 710, a processor 720, a transmitter 730, a memory 740 and a bus system 750. The receiver 710, the processor 720, the transmitter 730 and the memory 740 are connected through the bus system 750, the memory 740 is used to store instructions, the processor 720 is used to execute the instructions stored in the memory 740 to control the receiver 710 to receive signals and control the transmitter 730 to transmit signals.

The receiver 710 is used to receive first resource instruction information transmitted by a second device, the first resource instruction information being used to indicate a resource allocated for at least one first zone covered by the second device; and the processor 720 is used to configure a resource for at least one second zone covered by the apparatus according to the first resource instruction information.

As an optional embodiment, the at least one first zone is adjacent to the at least one second zone.

As an optional embodiment, the transmitter 730 is used to, after configuring the resource for the at least one second zone covered by the apparatus according to the first resource instruction information, transmit second resource instruction information to the second device, the second resource instruction information being used to indicate a resource allocated for the at least one second zone.

As an optional embodiment, the processor 720 is specifically used to: configure the at least one second zone and the at least one first zone to occupy a same resource according to the first resource instruction information; or, configure a resource for the at least one second zone to be orthogonal to a resource for an adjacent zone in the at least one second zone according to the first resource instruction information.

As an optional embodiment, the processor 720 is further specifically used to: configure resources of adjacent zones in the at least one second zone to be orthogonal according to the first resource instruction information.

As an optional embodiment, the transmitter 730 is further used to: before receiving the first resource instruction information transmitted by the second device, transmit a resource request message to the second device, the resource request message being used to request the resource allocated for the at least one first zone; and the receiver 710 is specifically used to: receive the first resource instruction information transmitted by the second device according to the resource request message.

As an optional embodiment, the resource request message includes a transmission mode of the first resource instruction information, and the transmission mode includes: a periodic transmission mode or an aperiodic transmission mode.

As an optional embodiment, the apparatus 700 is a device in an Internet of Vehicles, and/or, the second device is a device in the Internet of Vehicles.

It should be understood that the apparatus 700 may be the first device in the above-described embodiment and may be used to perform various steps and/or processes corresponding to the first device in the above-described method embodiment. Optionally, the memory 740 may include a read only memory and a random access memory, and provide instructions and data to the processor. A portion of the memory may also include a non-volatile random access memory. For example, the memory may also store device type information. The processor 720 may be used to execute instructions stored in the memory, and when the processor executes the instructions, the processor may perform various steps corresponding to the first device in the method embodiment described above.

Figure 8:
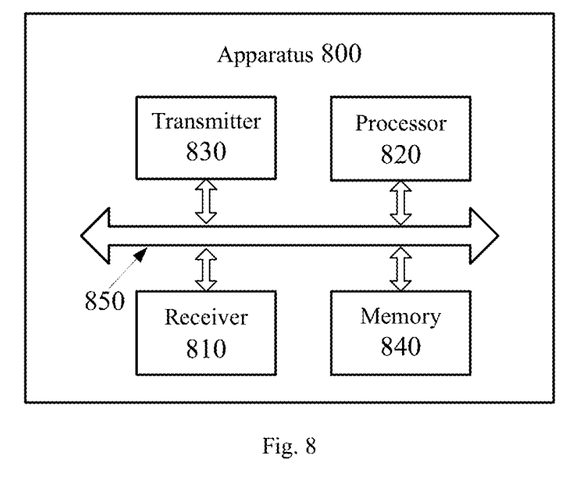
FIG. 8 is a schematic block diagram of another apparatus for resource allocation according to an embodiment of the present application.

FIG. 8 illustrates an apparatus for resource allocation 800 provided by an embodiment of the present application, for instance, the apparatus 800 may be a second device. The apparatus 800 includes a receiver 810, a processor 820, a transmitter 830, a memory 840 and a bus system 850. The receiver 810, the processor 820, the transmitter 830 and the memory 840 are connected through the bus system 850, the memory 840 is used to store instructions, the processor 820 is used to execute the instructions stored in the memory 840 to control the receiver 810 to receive signals and control the transmitter 830 to transmit signals.

The transmitter 830 is used to transmit first resource instruction information to a first device, the first resource instruction information being used to indicate a resource allocated for at least one first zone covered by the second device, so that the first device configures a resource for at least one second zone covered by the first device according to the first resource instruction information.

As an optional embodiment, the at least one first zone is adjacent to the at least one second zone.

As an optional embodiment, the receiver 810 is further used to: after transmitting the first resource instruction information to the first device, receive second resource instruction information transmitted by the first device, the second resource instruction information being used to indicate a resource allocated for the at least one second zone.

As an optional embodiment, the receiver 810 is further used to: before transmitting the first resource instruction information to the first device, receive a resource request message transmitted by the first device, the resource request message being used to request the resource allocated for the at least one first zone; and the transmitter 830 is specifically used to: transmit the first resource instruction information to the first device according to the resource request message.

As an optional embodiment, the resource request message includes a transmission mode of the first resource instruction information, and the transmission mode includes: a periodic transmission mode or an aperiodic transmission mode.

As an optional embodiment, the first device is a device in an Internet of Vehicles, and/or, the apparatus 800 is a device in the Internet of Vehicles.

It should be understood that the apparatus 800 may be the second device in the above-described embodiment and may be used to perform various steps and/or processes corresponding to the second device in the above-described method embodiment. Optionally, the memory 840 may include a read only memory and a random access memory, and provide instructions and data to the processor. A portion of the memory may also include a non-volatile random access memory. For example, the memory may also store device type information. The processor 820 may be used to execute instructions stored in the memory, and when the processor executes the instructions, the processor may perform various steps corresponding to the second device in the method embodiment described above.

It should be understood that in the embodiments of the present application, the processor 720 and the processor 820 may be a Central Processing Unit (CPU), and the processor may also be other general purpose processor, Digital Signal Processor (DSP), Application Specific Integrated Circuits (ASIC), Field Programmable Gate Array (FPGA) or other programmable logic device, discrete gate or transistor logic device, discrete hardware components, etc. The general purpose processor may be a microprocessor or the processor may be any conventional processor, or the like.

It should be understood that the term "and/or" herein is merely an association relationship describing associated objects, indicating that there may be three relationships, for example, A and/or B, may represent three situations: A exists alone, A and B coexist, or B exists alone. In addition, the character "/" herein generally indicates that the contextual objects is of an "or" relationship.

It should be understood that in various embodiments of the present application, the size of the sequence numbers of the above-mentioned processes does not mean the order of execution, and the order of execution of each process should be determined by its function and internal logic, and should not constitute any limitation on the implementation process of the embodiments of the present application.

Those of ordinary skills in the art may be aware that, the units and algorithm steps in individual examples described in combination with the embodiments described in the present disclosure may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by those skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed systems, apparatuses and methods may be implemented in other ways. For example, the apparatus embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, may be located in one place, or may be distributed on multiple network units. Some or all of the units may be selected according to actual needs to achieve the objectives of the solutions in the embodiments.

In addition, each functional unit in each embodiment of the present application may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present application, or the part contributing to the prior art or all or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present application. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely detailed embodiments of the present application, but the protection scope of the present application is not limited thereto. Any person skilled in the art can easily think of changes or substitutions within the technical scope of the present application, and all the changes or substitutions should be covered by the protection scope of the present application. Therefore, the protection scope of the present application should be subjected to the protection scope of the claims.

What is claimed is:

1. A method for resource allocation, comprising:
   receiving, by a first device, first resource instruction information transmitted by a second device, the first resource instruction information being used to indicate a resource allocated for at least one first zone covered by the second device; and
   configuring, by the first device, a resource for at least one second zone covered by the first device according to the first resource instruction information;
   wherein after the configuring, by the first device, the resource for the at least one second zone covered by the first device according to the first resource instruction information, the method further comprises:
   transmitting, by the first device, second resource instruction information to the second device, the second resource instruction information being used to indicate a resource allocated for the at least one second zone.

2. The method according to claim 1, wherein the at least one first zone is adjacent to the at least one second zone.

3. The method according to claim 1, wherein the configuring, by the first device, the resource for the at least one second zone covered by the first device according to the first resource instruction information comprises:
   configuring, by the first device, the at least one second zone and the at least one first zone to occupy a same resource according to the first resource instruction information; or,
   configuring, by the first device, a resource for the at least one area of the second zone to be orthogonal to a resource for an adjacent area of the first zone according to the first resource instruction information.

4. The method according to claim 1, wherein the configuring, by the first device, the resource for the at least one second zone covered by the first device according to the first resource instruction information comprises:
   configuring, by the first device, resources of adjacent areas in the at least one second zone to be orthogonal according to the first resource instruction information.

5. The method according to claim 1, wherein before the receiving, by the first device, the first resource instruction information transmitted by the second device, the method further comprises:
   transmitting, by the first device, a resource request message to the second device, the resource request message being used to request the resource allocated for the at least one first zone; and
   wherein, the receiving, by the first device, the first resource instruction information transmitted by the second device comprises:
   receiving, by the first device, the first resource instruction information transmitted by the second device according to the resource request message.

6. The method according to claim 5, wherein the resource request message comprises a transmission mode of the first resource instruction information, and the transmission mode comprises: a periodic transmission mode or an aperiodic transmission mode.

7. The method according to claim 1, wherein at least one of the first device and the second device is a device in an Internet of Vehicles.

8. A method for resource allocation, comprising:
transmitting, by a second device, first resource instruction information to a first device, the first resource instruction information being used to indicate a resource allocated for at least one first zone covered by the second device, so that the first device configures a resource for at least one second zone covered by the first device according to the first resource instruction information;
wherein after the transmitting, by the second device, the first resource instruction information to the first device, the method further comprises:
receiving, by the second device, second resource instruction information transmitted by the first device, the second resource instruction information being used to indicate a resource allocated for the at least one second zone.

9. The method according to claim 8, wherein the at least one first zone is adjacent to the at least one second zone.

10. The method according to claim 8, wherein before the transmitting, by the second device, the first resource instruction information to the first device, the method further comprises:
receiving, by the second device, a resource request message transmitted by the first device, the resource request message being used to request the resource allocated for the at least one first zone; and
wherein, the transmitting, by the second device, the first resource instruction information to the first device comprises:
transmitting, by the second device, the first resource instruction information to the first device according to the resource request message.

11. The method according to claim 10, wherein the resource request message comprises a transmission mode of the first resource instruction information, and the transmission mode comprises: a periodic transmission mode or an aperiodic transmission mode.

12. An apparatus for resource allocation, comprising:
a processor; and
a memory for storing instructions executable by the processor;
wherein the processor is configured to:
receive first resource instruction information transmitted by a second device, the first resource instruction information being used to indicate a resource allocated for at least one first zone covered by the second device; and
configure a resource for at least one second zone covered by the apparatus according to the first resource instruction information;
wherein the processor is further configured to:
after configuring the resource for the at least one second zone covered by the apparatus according to the first resource instruction information, transmit second resource instruction information to the second device, the second resource instruction information being used to indicate a resource allocated for the at least one second zone.

13. The apparatus according to claim 12, wherein the at least one first zone is adjacent to the at least one second zone.

14. The apparatus according to claim 12, wherein the processor is further configured to:
configure the at least one second zone and the at least one first zone to occupy a same resource according to the first resource instruction information; or,
configure a resource for the at least one area of the second zone to be orthogonal to a resource for an adjacent area of the first zone according to the first resource instruction information.

15. The apparatus according to claim 12, wherein the processor is further configured to:
configure resources of adjacent areas in the at least one second zone to be orthogonal according to the first resource instruction information.

16. The apparatus according to claim 12, wherein the processor is further configured to:
a second transmitting module configured to, before receiving the first resource instruction information transmitted by the second device, transmit a resource request message to the second device, the resource request message being used to request the resource allocated for the at least one first zone;
wherein, the receiving module is configured to receive the first resource instruction information transmitted by the second device according to the resource request message.

17. The apparatus according to claim 16, wherein the resource request message comprises a transmission mode of the first resource instruction information, and the transmission mode comprises: a periodic transmission mode or an aperiodic transmission mode.

* * * * *